US012331819B1

(12) United States Patent
Walter et al.

(10) Patent No.: US 12,331,819 B1
(45) Date of Patent: Jun. 17, 2025

(54) TORQUE TRANSFER DEVICE CONTROL FOR A VEHICLE

(71) Applicant: GM Global Technology Operations LLC, Detroit, MI (US)

(72) Inventors: James R. Walter, Ann Arbor, MI (US); Steven Gene Reini, Waterford, MI (US); Shane Macfarlane, Northville, MI (US); Brian Ronald Goodman, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/749,902

(22) Filed: Jun. 21, 2024

(51) Int. Cl.
| | | |
|---|---|---|
| *B60W 10/04* | (2006.01) | |
| *B60W 10/18* | (2012.01) | |
| *F16H 48/30* | (2012.01) | |
| *F16H 48/20* | (2012.01) | |

(52) U.S. Cl.
CPC ............. *F16H 48/30* (2013.01); *B60W 10/04* (2013.01); *B60W 10/18* (2013.01); *B60W 2520/14* (2013.01); *B60W 2520/26* (2013.01); *B60W 2530/20* (2013.01); *B60W 2710/06* (2013.01); *B60W 2710/18* (2013.01); *F16H 2048/204* (2013.01)

(58) Field of Classification Search
CPC . F16H 2048/204; B60W 10/04; B60W 10/18; B60W 10/184; B60W 2530/82; B60W 2520/14; B60W 2520/26; B60W 2710/06; B60W 2710/08; B60W 2710/18; B60W 2510/0208; B60W 2510/125

USPC ............ 701/51, 53, 54, 67, 68; 47/183, 184, 47/185, 186, 170, 181
See application file for complete search history.

(56) References Cited

U.S. PATENT DOCUMENTS

| | | | | |
|---|---|---|---|---|
| 9,610,859 | B1 * | 4/2017 | Cho ...................... | B60W 10/06 |
| 9,694,825 | B2 * | 7/2017 | Yoon ..................... | B60W 10/02 |
| 12,194,861 | B2 * | 1/2025 | Harada .................. | F16H 59/66 |
| 2024/0383476 | A1 * | 11/2024 | Spühler ................. | B60W 10/04 |

FOREIGN PATENT DOCUMENTS

| | | | |
|---|---|---|---|
| DE | 102017107494 A1 | 10/2018 | |
| DE | 102018100287 A1 | 5/2019 | |
| WO | WO-2004054838 A1 * | 7/2004 | ............ B60T 8/4809 |

* cited by examiner

*Primary Examiner* — Roger L Pang
(74) *Attorney, Agent, or Firm* — Vivacqua Crane, PLLC

(57) ABSTRACT

A method for controlling a torque transfer device for a vehicle may include identifying a self-locking state of the torque transfer device. The method further may include determining a drivetrain unlocking torque necessary to unlock the torque transfer device in response to identifying the self-locking state. The method further may include determining a drivetrain compensation torque necessary to counteract a drivetrain unlocking torque dynamic effect of the drivetrain unlocking torque in response to identifying the self-locking state. The method further may include applying the drivetrain unlocking torque and the drivetrain compensation torque using one or more drivetrain components of the vehicle in response to identifying the self-locking state.

17 Claims, 3 Drawing Sheets

TORQUE TRANSFER DEVICE CONTROL FOR A VEHICLE

INTRODUCTION

The present disclosure relates to systems and methods for drivetrain control for a vehicle, and more particularly, to systems and methods for controlling a torque transfer device for a vehicle.

To increase occupant comfort and vehicle capability, vehicles may be equipped with torque transfer devices which are configured to transmit or transfer torque between drivetrain components of the vehicle. Torque transfer devices may include, for example, transfer cases, axle disconnect systems, wheel end disconnect systems, differentials, locking differentials, and/or the like. Torque transfer devices may include clutches (e.g., dog clutches, face splines, friction clutches, and/or the like) which are configured to be mechanically, electromechanically, electromagnetically, and/or hydraulically controlled in order to adjust an operation of the torque transfer device. However, in certain situations, torque differentials may develop across the torque transfer device, preventing normal disengagement of mechanical components like clutches due to binding or self-locking. Current torque transfer device control systems and methods may not effectively mitigate or resolve binding or self-locking of clutches or other mechanical components due to torque differentials.

Thus, while current torque transfer device control systems and methods achieve their intended purpose, there is a need for a new and improved system and method for controlling a torque transfer device for a vehicle.

SUMMARY

According to several aspects, a method for controlling a torque transfer device for a vehicle is provided. The method may include identifying a self-locking state of the torque transfer device. The method further may include determining a drivetrain unlocking torque necessary to unlock the torque transfer device in response to identifying the self-locking state. The method further may include determining a drivetrain compensation torque necessary to counteract a drivetrain unlocking torque dynamic effect of the drivetrain unlocking torque in response to identifying the self-locking state. The method further may include applying the drivetrain unlocking torque and the drivetrain compensation torque using one or more drivetrain components of the vehicle in response to identifying the self-locking state.

In another aspect of the present disclosure, identifying the self-locking state of the torque transfer device further may include determining a self-locking torque threshold of the torque transfer device based at least in part on a mechanical design of the torque transfer device. Identifying the self-locking state of the torque transfer device further may include determining an applied torque on the torque transfer device. Identifying the self-locking state of the torque transfer device further may include identifying the self-locking state in response to determining that the applied torque is greater than or equal to the self-locking torque threshold.

In another aspect of the present disclosure, determining the applied torque further may include determining the applied torque on the torque transfer device using a formula:

$$\tau_A = |\tau_1 - \tau_2|$$

where $\tau_A$ is the applied torque on the torque transfer device, $\tau_1$ is a torque on a first port of the torque transfer device, and $\tau_2$ is a torque on a second port of the torque transfer device.

In another aspect of the present disclosure, determining the drivetrain unlocking torque further may include determining the drivetrain unlocking torque necessary to unlock the torque transfer device using a formula:

$$\tau_u \geq |\mu_1(S_1)*N_1*r_1 + \mu_2(S_2)*N_2*r_2| - \tau_s$$

where $\tau_u$ is the drivetrain unlocking torque, $\mu_1$ is a first coefficient of friction as a function of a first longitudinal slip ratio $S_1$ of a first tire connected to a first port of the torque transfer device, N is a first normal force applied to the first tire, $r_1$ is a first effective radius of the first tire, $\mu_2$ is a second coefficient of friction as a function of a second longitudinal slip ratio $S_2$ of a second tire connected to a second port of the torque transfer device, $N_2$ is a second normal force applied to the second tire, $r_2$ is a second effective radius of the second tire, and $\tau_s$ is the self-locking torque threshold.

In another aspect of the present disclosure, determining the drivetrain compensation torque further may include estimating the drivetrain unlocking torque dynamic effect of applying the drivetrain unlocking torque using the one or more drivetrain components of the vehicle. Determining the drivetrain compensation torque further may include determining the drivetrain compensation torque based at least in part on the drivetrain unlocking torque dynamic effect.

In another aspect of the present disclosure, estimating the drivetrain unlocking torque dynamic effect further may include determining an estimated longitudinal acceleration caused by applying the drivetrain unlocking torque using the one or more drivetrain components of the vehicle. Estimating the drivetrain unlocking torque dynamic effect further may include determining an estimated change in yaw caused by applying the drivetrain unlocking torque using the one or more drivetrain components of the vehicle. Estimating the drivetrain unlocking torque dynamic effect further may include estimating the drivetrain unlocking torque dynamic effect. The drivetrain unlocking torque dynamic effect includes the estimated longitudinal acceleration and the estimated change in yaw.

In another aspect of the present disclosure, applying the drivetrain unlocking torque and the drivetrain compensation torque further may include comparing the drivetrain unlocking torque to a maximum drivetrain unlocking torque threshold. Applying the drivetrain unlocking torque and the drivetrain compensation torque further may include comparing the drivetrain compensation torque to a maximum drivetrain compensation torque threshold. Applying the drivetrain unlocking torque and the drivetrain compensation torque further may include applying the drivetrain unlocking torque and the drivetrain compensation torque in response to determining that the drivetrain unlocking torque is less than or equal to the maximum drivetrain unlocking torque threshold and that the drivetrain compensation torque is less than or equal to the maximum drivetrain compensation torque threshold.

In another aspect of the present disclosure, applying the drivetrain unlocking torque and the drivetrain compensation torque further may include estimating a total dynamic effect of applying the drivetrain unlocking torque and the drivetrain compensation torque. Applying the drivetrain unlocking torque and the drivetrain compensation torque further may include comparing the total dynamic effect to a predetermined total dynamic effect threshold. Applying the drivetrain unlocking torque and the drivetrain compensation torque further may include applying the drivetrain unlocking torque and the drivetrain compensation torque in response to determining that the total dynamic effect is less than or equal to the predetermined total dynamic effect threshold.

In another aspect of the present disclosure, applying the drivetrain unlocking torque and the drivetrain compensation torque further may include determining a drivetrain unlocking torque application profile. The drivetrain unlocking torque application profile includes one of: a constant torque profile and a variable torque profile. The constant torque profile includes application of a constant torque greater than or equal to the drivetrain unlocking torque during a majority of a duration of a drivetrain unlocking torque application process. The variable torque profile includes application of a variable torque having a peak value greater than or equal to the drivetrain unlocking torque and a varying torque value during the majority of the duration of the drivetrain unlocking torque application process. Applying the drivetrain unlocking torque and the drivetrain compensation torque further may include applying the drivetrain unlocking torque and the drivetrain compensation torque based at least in part on the drivetrain unlocking torque application profile.

In another aspect of the present disclosure, applying the drivetrain unlocking torque and the drivetrain compensation torque further may include applying the drivetrain unlocking torque using one or more brake actuators of the vehicle. Applying the drivetrain unlocking torque and the drivetrain compensation torque further may include applying the drivetrain compensation torque using at least one of the one or more brake actuators of the vehicle and one or more propulsion actuators of the vehicle.

According to several aspects, a system for controlling a torque transfer device for a vehicle is provided. The system may include the torque transfer device having a first port and a second port, a first brake actuator mechanically connected with the first port of the torque transfer device, a second brake actuator mechanically connected with the second port of the torque transfer device, and a controller in electrical communication with the first brake actuator and the second brake actuator. The controller is programmed to identify a self-locking state of the torque transfer device. The controller is further programmed to determine a drivetrain unlocking torque necessary to unlock the torque transfer device in response to identifying the self-locking state. The controller is further programmed to apply the drivetrain unlocking torque using at least one of: the first brake actuator and the second brake actuator.

In another aspect of the present disclosure, the torque transfer device is an electronically controllable locking differential. To identify the self-locking state of the torque transfer device, the controller is further programmed to determine a self-locking torque threshold of the torque transfer device based at least in part on a mechanical design of the torque transfer device. To identify the self-locking state of the torque transfer device, the controller is further programmed to determine an applied torque on the torque transfer device using a formula:

$$\tau_A = |\tau_1 - \tau_2|$$

where $\tau_A$ is the applied torque on the torque transfer device, $\tau_1$ is a torque on a first port of the torque transfer device, and $\tau_2$ is a torque on a second port of the torque transfer device.

In another aspect of the present disclosure, to determine the drivetrain unlocking torque, the controller is further programmed to determine the drivetrain unlocking torque necessary to unlock the torque transfer device using a formula:

$$\tau_u \geq |\mu_1(S_1) * N_1 * r_1 + \mu_2(S_2) * N_2 * r_2| - \tau_s$$

where $\tau_u$ is the drivetrain unlocking torque, $\mu_1$ is a first coefficient of friction as a function of a first longitudinal slip ratio $S_1$ of a first tire connected to a first port of the torque transfer device, $N_1$ is a first normal force applied to the first tire, $r_1$ is a first effective radius of the first tire, $\mu_2$ is a second coefficient of friction as a function of a second longitudinal slip ratio $S_2$ of a second tire connected to a second port of the torque transfer device, $N_2$ is a second normal force applied to the second tire, $r_2$ is a second effective radius of the second tire, and $\tau_s$ is the self-locking torque threshold.

In another aspect of the present disclosure, to apply the drivetrain unlocking torque, the controller is further programmed to determine a drivetrain unlocking torque application profile. The drivetrain unlocking torque application profile includes one of: a constant torque profile and a variable torque profile. The constant torque profile includes application of a constant torque greater than or equal to the drivetrain unlocking torque during a majority of a duration of a drivetrain unlocking torque application process. The variable torque profile includes application of a variable torque having a peak value greater than or equal to the drivetrain unlocking torque and a varying torque value during the majority of the duration of the drivetrain unlocking torque application process. To apply the drivetrain unlocking torque, the controller is further programmed to apply the drivetrain unlocking torque based at least in part on the drivetrain unlocking torque application profile.

In another aspect of the present disclosure, the system further includes a propulsion actuator in electrical communication with the controller. The controller is further programmed to determine a drivetrain compensation torque necessary to counteract a drivetrain unlocking torque dynamic effect of the drivetrain unlocking torque in response to identifying the self-locking state. The controller is further programmed to apply the drivetrain compensation torque using the propulsion actuator.

In another aspect of the present disclosure, to determine the drivetrain compensation torque, the controller is further programmed to determine an estimated longitudinal acceleration caused by applying the drivetrain unlocking torque using at least one of: the first brake actuator and the second brake actuator. To determine the drivetrain compensation torque, the controller is further programmed to determine an estimated change in yaw caused by applying the drivetrain unlocking torque using at least one of: the first brake actuator and the second brake actuator. To determine the drivetrain compensation torque, the controller is further programmed to estimate a drivetrain unlocking torque dynamic effect. The drivetrain unlocking torque dynamic effect includes the estimated longitudinal acceleration and the estimated change in yaw. To determine the drivetrain compensation torque, the controller is further programmed to determine the drivetrain compensation torque based at least in part on the drivetrain unlocking torque dynamic effect.

In another aspect of the present disclosure, to apply the drivetrain unlocking torque and the drivetrain compensation torque, the controller is further programmed to compare the drivetrain unlocking torque to a maximum drivetrain unlocking torque threshold. To apply the drivetrain unlocking torque and the drivetrain compensation torque, the controller is further programmed to compare the drivetrain compensation torque to a maximum drivetrain compensation torque threshold. To apply the drivetrain unlocking torque and the drivetrain compensation torque, the controller is further programmed to estimate a total dynamic effect of applying the drivetrain unlocking torque and the drivetrain compensation torque. To apply the drivetrain unlocking torque and the drivetrain compensation torque, the controller is further programmed to compare the total dynamic effect to a predetermined total dynamic effect threshold. To apply the drivetrain unlocking torque and the drivetrain compensation torque, the controller is further programmed to apply the drivetrain unlocking torque and the drivetrain compensation torque in response to determining that the drivetrain unlocking torque is less than or equal to the maximum drivetrain unlocking torque threshold, that the drivetrain compensation torque is less than or equal to the maximum drivetrain compensation torque threshold, and that the total dynamic effect is less than or equal to the predetermined total dynamic effect threshold.

According to several aspects, a method for controlling a torque transfer device for a vehicle is provided. The method may include identifying a self-locking state of a rear locking differential of the vehicle. The method further may include determining a drivetrain unlocking torque necessary to unlock the rear locking differential in response to identifying the self-locking state. The method further may include determining a drivetrain compensation torque necessary to counteract a drivetrain unlocking torque dynamic effect of the drivetrain unlocking torque in response to identifying the self-locking state. The method further may include applying the drivetrain unlocking torque and the drivetrain compensation torque using at least one of: a rear brake actuator, a front propulsion actuator, and a rear propulsion actuator of the vehicle in response to identifying the self-locking state.

In another aspect of the present disclosure, determining the drivetrain unlocking torque further may include determining the drivetrain unlocking torque necessary to unlock the torque transfer device using a formula:

$$\tau_u \geq |\mu_1(S_1)*N_1*r_1 + \mu_2(S_2)*N_2*r_2| - \tau_s$$

where $\tau_u$ is the drivetrain unlocking torque, $\mu_1$ is a first coefficient of friction as a function of a first longitudinal slip ratio $S_1$ of a first tire connected to a first port of the torque transfer device, $N_1$ is a first normal force applied to the first tire, $r_1$ is a first effective radius of the first tire, $\mu_2$ is a second coefficient of friction as a function of a second longitudinal slip ratio $S_2$ of a second tire connected to a second port of the torque transfer device, $N_2$ is a second normal force applied to the second tire, $r_2$ is a second effective radius of the second tire, and $\tau_s$ is the self-locking torque threshold.

In another aspect of the present disclosure, applying the drivetrain unlocking torque and the drivetrain compensation torque further may include estimating a total dynamic effect of applying the drivetrain unlocking torque and the drivetrain compensation torque. Applying the drivetrain unlocking torque and the drivetrain compensation torque further may include comparing the total dynamic effect to a predetermined total dynamic effect threshold. Applying the drivetrain unlocking torque and the drivetrain compensation torque further may include comparing the drivetrain unlocking torque to a maximum drivetrain unlocking torque threshold. Applying the drivetrain unlocking torque and the drivetrain compensation torque further may include comparing the drivetrain compensation torque to a maximum drivetrain compensation torque threshold. Applying the drivetrain unlocking torque and the drivetrain compensation torque further may include determining a drivetrain unlocking torque application profile. The drivetrain unlocking torque application profile includes one of: a constant torque profile and a variable torque profile. The constant torque profile includes application of a constant torque greater than or equal to the drivetrain unlocking torque during a majority of a duration of a drivetrain unlocking torque application process. The variable torque profile includes application of a variable torque having a peak value greater than or equal to the drivetrain unlocking torque and a varying torque value during the majority of the duration of the drivetrain unlocking torque application process. Applying the drivetrain unlocking torque and the drivetrain compensation torque further may include applying the drivetrain unlocking torque and the drivetrain compensation torque based at least in part on the drivetrain unlocking torque application profile in response to determining that the drivetrain unlocking torque is less than or equal to the maximum drivetrain unlocking torque threshold, that the drivetrain compensation torque is less than or equal to the maximum drivetrain compensation torque threshold, and that the total dynamic effect is less than or equal to the predetermined total dynamic effect threshold.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In aspects of the present disclosure, torque transfer devices such as, for example, locking differentials, may include clutches (e.g., dog clutches, face splines, friction clutches, and/or the like) which are configured to be mechanically, electromechanically, electromagnetically, and/or hydraulically controlled in order to adjust an operation of the torque transfer device. However, in certain situations, torque differentials may develop across the torque transfer device, inducing a "self-locking state" which prevents normal operation of the torque transfer device. Accordingly, the present disclosure provides a new and improved system and method for torque transfer device control allowing for mitigation and resolution of self-locking states due to torque differentials.

Figure 1:
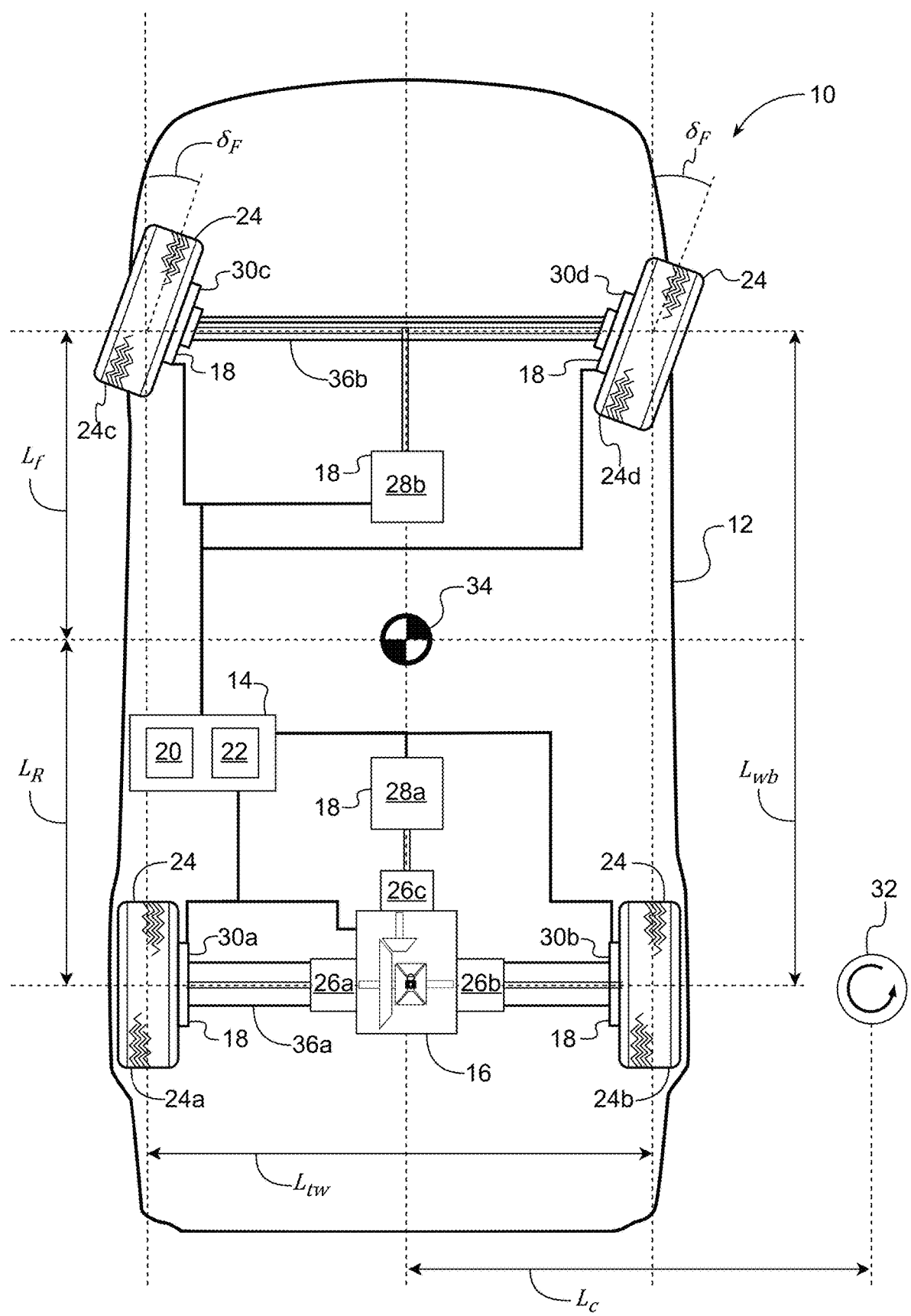
FIG. 1 is a schematic diagram for a system for controlling a torque transfer device for a vehicle, according to an exemplary embodiment.

Referring to FIG. 1, a system for controlling a torque transfer device for a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, a torque transfer device 16, and a plurality of drivetrain components 18.

The controller 14 is used to implement a method 100 for controlling a torque transfer device, as will be described below. The controller 14 includes at least one processor 20 and a non-transitory computer readable storage device or media 22. The processor 20 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions.

The computer readable storage device or media 22 may include volatile and nonvolatile storage in read-only memory (ROM), random-access memory (RAM), and keep-alive memory (KAM), for example. KAM is a persistent or non-volatile memory that may be used to store various operating variables while the processor 20 is powered down. The computer-readable storage device or media 22 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12.

The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the torque transfer device 16 and the plurality of drivetrain components 18. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 14 are within the scope of the present disclosure. It should further be understood that, in the scope of the present disclosure, electrical communication also includes power and/or energy transfer between electrical devices (e.g., using conducting wires and/or wireless power transmission techniques).

The torque transfer device 16 is used to transfer torque between one or more of the plurality of drivetrain components 18 and one or more of a plurality of tires 24 of the vehicle 12. In an exemplary embodiment, the torque transfer device 16 includes at least a first port 26a and a second port 26b. In some embodiments, the torque transfer device 16 further includes a third port 26c. The torque transfer device 16 further includes mechanical components such as, for example, gears, chains, belts, torque converters, and/or the like which facilitate torque transfer between at least two of the first port 26a, the second port 26b, and the third port 26c.

In some embodiments, the mechanical components further include clutches (e.g., dog clutches, face splines, friction clutches, and/or the like) which are configured to be mechanically, electromechanically, electromagnetically, and/or hydraulically controlled in order to adjust an operation of the torque transfer device 16 (e.g., to adjust an amount of torque transferred between at least two of the first port 26a, the second port 26b, and the third port 26c). However, under some conditions, a difference between a torque at any two of the first port 26a, the second port 26b, and the third port 26c may exceed a self-locking torque threshold, inhibiting proper operation of the mechanical components to adjust the operation of the torque transfer device 16. The self-locking torque threshold is determined by the mechanical design of the torque transfer device 16.

In a non-limiting example depicted in FIG. 1, the torque transfer device 16 is an electronically controllable locking differential configured to transfer torque from the third port 26c to a first tire 24a of the plurality of tires 24 connected to the first port 26a and a second tire 24b of the plurality of tires 24 connected to the second port 26b in order to propel the first tire 24a and the second tire 24b of the vehicle 12. The locking differential includes mechanical components allowing the first tire 24a to rotate independently of the second tire 24b (e.g., at different speeds and/or different directions) in an unlocked state. The locking differential further includes mechanical components forcing the first tire 24a to rotate with the second tire 24b (i.e., at a same speed and in a same direction) in a locked state.

The locking differential further includes a clutch (e.g., a dog clutch) which is mechanically, electromechanically, electromagnetically, and/or hydraulically controlled (e.g., via a solenoid configured to electromagnetically move the clutch from an unlocked position to a locked position) in order to switch the operation of the locking differential between the unlocked state and the locked state. In a non-limiting example, the locking differential is in electrical communication with the controller 14 for electronic control of the clutch. However, under some conditions (e.g., when executing a turn), a difference between a torque applied at the first port 26a by the first tire 24a and a torque applied at the second port 26b by the second tire 24b may exceed a self-locking torque threshold (determined by the mechanical design of the clutch), preventing disengagement of the clutch and thus preventing switching of the locking differential from the locked state to the unlocked state. This condition is referred to as a "self-locking state". The present disclosure provides new and improved systems and methods for mitigating and/or resolving the self-locking state, as will be discussed in greater detail below.

For the sake of explanation, the remainder of the present disclosure will discuss the torque transfer device 16 in terms of the locking differential discussed above as an example of a torque transfer device 16. However, it should be understood that the torque transfer device 16 includes any mechanical device operable to transfer torque between one or more of the plurality of drivetrain components 18 and one or more of the plurality of tires 24 of the vehicle 12, including, for example, a limited slip locking differential, an automatic locking differential, a transfer case, a front/rear axle disconnect system, a wheel end disconnect system, a transfer case or power transfer unit disconnect system, and/or the like.

The plurality of drivetrain components 18 are used to provide propulsion and braking for the vehicle 12. In an exemplary embodiment, the plurality of drivetrain components 18 includes a rear propulsion actuator 28a, a front propulsion actuator 28b, a first brake actuator 30a, a second brake actuator 30b, a third brake actuator 30c, and a fourth brake actuator 30d.

The rear propulsion actuator 28a is used to provide torque to drive (i.e., accelerate) a first tire 24a and a second tire 24b (i.e., rear tires) of the plurality of tires 24 of the vehicle 12.

The front propulsion actuator 28b is used to provide torque to drive (i.e., accelerate) a third tire 24c and a fourth tire 24d (i.e., front tires) of the plurality of tires 24 of the vehicle 12.

In an exemplary embodiment, the rear propulsion actuator 28a and the front propulsion actuator 28b is an internal combustion engine such as, for example, a gasoline engine or a diesel engine. In another exemplary embodiment, the rear propulsion actuator 28a and the front propulsion actuator 28b is an electric machine such as, for example, a three-phase AC electric motor or a DC electric motor. In another exemplary embodiment, the rear propulsion actuator 28a and the front propulsion actuator 28b is a hybrid system including both an internal combustion engine and an electric machine.

The rear propulsion actuator 28a is mechanically connected to one of the first port 26a, the second port 26b, and the third port 26c of the torque transfer device 16. In the exemplary embodiment shown in FIG. 1, the rear propulsion actuator 28a is mechanically connected to the third port 26c of the locking differential. The front propulsion actuator 28b is mechanically connected to the third tire 24c and the fourth tire 24d through a front differential (not shown). In an exemplary embodiment, the rear propulsion actuator 28a and the front propulsion actuator 28b are realized by one unit having two outputs (e.g., an internal combustion engine connected to a transmission and a transfer case or an electric machine connected to a transfer case). In another exemplary embodiment, the rear propulsion actuator 28a and the front propulsion actuator 28b are realized by two separate units (e.g., a first electric machine and a second electric machine). The rear propulsion actuator 28a and the front propulsion actuator 28b are electrically connected to the controller 14 for electronic control of the rear propulsion actuator 28a and the front propulsion actuator 28b.

The first brake actuator 30a, the second brake actuator 30b, the third brake actuator 30c, and the fourth brake actuator 30d are used to provide torque to brake (i.e., decelerate) one or more of the plurality of tires 24 of the vehicle 12. The first brake actuator 30a is operable to provide a braking torque on the first tire 24a. The second brake actuator 30b is operable to provide a braking torque on the second tire 24b. The third brake actuator 30c is operable to provide a braking torque on the third tire 24c. The fourth brake actuator 30d is operable to provide a braking torque on the fourth tire 24d. The first brake actuator 30a and the second brake actuator 30b are also referred to as rear brake actuators. The third brake actuator 30c and the fourth brake actuator 30d are also referred to as front brake actuators.

In an exemplary embodiment, the first brake actuator 30a, the second brake actuator 30b, the third brake actuator 30c, and the fourth brake actuator 30d are hydraulically actuated brakes which are connected to a central vehicle hydraulic system (not shown). The hydraulically actuated brakes may be actuated using a brake pedal force applied by an occupant or by an electronically controlled hydraulic pump and/or manifold system capable of individually controlling brake pressure applied to each of the first brake actuator 30a, the second brake actuator 30b, the third brake actuator 30c, and the fourth brake actuator 30d. In another exemplary embodiment, the first brake actuator 30a, the second brake actuator 30b, the third brake actuator 30c, and the fourth brake actuator 30d are self-contained electro-mechanical brakes (EMB) or electro-hydraulic brakes (EHB) which are individually electronically controlled as part of a brake-by-wire system. It should be understood that any braking system operable to provide individually electronically controllable braking force on each of the plurality of tires 24, including, for example, regenerative braking systems, is within the scope of the present disclosure.

In any case, the first brake actuator 30a, the second brake actuator 30b, the third brake actuator 30c, and the fourth brake actuator 30d are directly or indirectly in electrical communication with the controller 14, allowing for electronically controlled individual actuation of the first brake actuator 30a, the second brake actuator 30b, the third brake actuator 30c, and the fourth brake actuator 30d to apply braking torque on the plurality of tires 24.

With continued reference to FIG. 1, the vehicle 12 is shown in a right-hand turn around a turn center 32. Furthermore, a center of gravity (CG) 34 of the vehicle 12 is indicated. The first tire 24a and the second tire 24b are driven via a rear axle 36a. The second tire 24b and the third tire 24c are driven via a front axle 36b.

Figure 2:
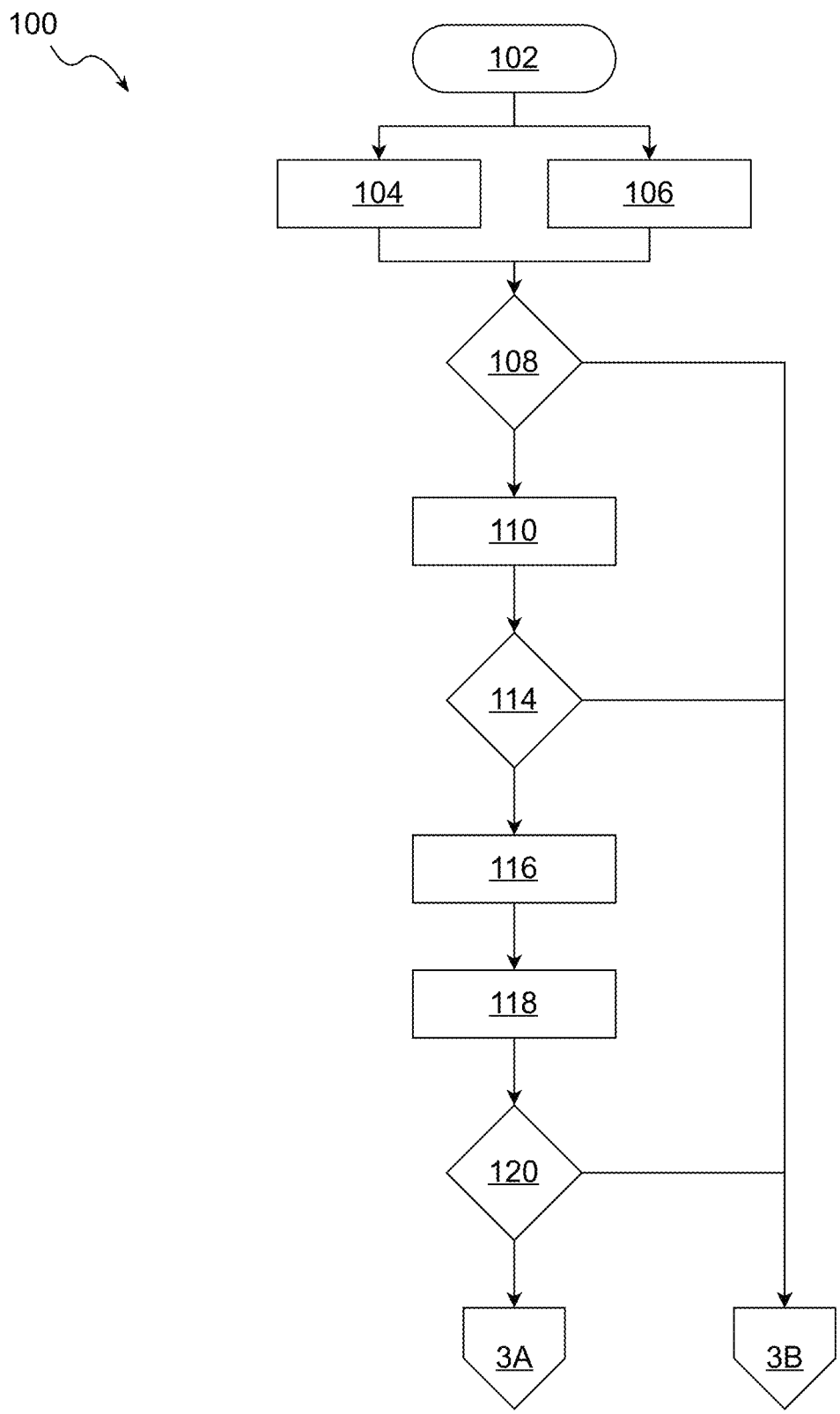
FIG. 2 is a flowchart of the method for controlling a torque transfer device for a vehicle, according to an exemplary embodiment.

Referring to FIG. 2, a flowchart of the method 100 for controlling a torque transfer device for a vehicle is shown. The method 100 begins at block 102 and proceeds to blocks 104 and 106. At block 104, the controller 14 determines the self-locking torque threshold of the torque transfer device 16. As discussed above, the self-locking torque threshold is determined by the mechanical design of the torque transfer device 16, including, for example, gear ratio, gear pitch, gear tooth profile, gear tooth pressure angle, clutch design (e.g., dog pitch, dog pressure angle, dog profile, spring force, and/or the like) and/or the like of the mechanical components of the torque transfer device 16. In an exemplary embodiment, the self-locking torque threshold is predetermined by laboratory testing, in-situ testing, computer simulation, and/or the like, and stored in the media 22 of the controller 14. It should be understood that additional methods for determining the self-locking torque threshold, including, for example, analysis of recorded diagnostic data about the torque transfer device 16, are within the scope of the present disclosure. After block 104, the method 100 proceeds to block 108, as will be discussed in greater detail below.

At block 106, the controller 14 determines an applied torque on the torque transfer device 16. In the scope of the present disclosure, the applied torque is a difference between a torque applied between any two of the first port 26a, the second port 26b, and the third port 26c causing the self-locking state. In the non-limiting example of the rear locking differential discussed above, the applied torque is a difference between a torque applied at the first port 26a by the first tire 24a and a torque applied at the second port 26b by the second tire 24b:

$$\tau_A = |\tau_1 - \tau_2| \quad (1)$$

where $\tau_A$ is the applied torque on the torque transfer device 16, $\tau_1$ is a torque on the first port 26a of the torque transfer device 16, and $\tau_2$ is a torque on the second port 26b of the torque transfer device 16. In a non-limiting example where the torque transfer device 16 is a rear locking differential and the vehicle 12 is performing a right-hand turn, the first tire 24a is considered to be on the "outside" of the turn and the second tire 24b is considered to be on the "inside" of the turn, and the torque applied at the first port 26a by the first tire 24a and the torque applied at the second port 26b by the second tire 24b is determined using the following equations:

$$\tau_1 = -\mu_1(S_1) * N_1 * r_1 \quad (2a)$$

$$\tau_2 = \mu_2(S_2) * N_2 * r_2 \quad (2b)$$

$$S_1 = 100 * \left(1 - \frac{V_1}{V_1'}\right) \quad (3a)$$

$$S_2 = 100 * \left(1 - \frac{V_2}{V_2'}\right) \quad (3b)$$

$$V_1' = \frac{V_R * \left(L_c + \frac{L_{tw}}{2}\right)}{L_c} \quad (4a)$$

$$V_2' = \frac{V_R * \left(L_c - \frac{L_{tw}}{2}\right)}{L_c} \quad (4b)$$

$$V_R = V\cos(\beta) \quad (5)$$

$$L_c = \frac{L_R}{\tan(\beta)} \quad (6)$$

$$\beta = \tan^{-1}\left(\frac{L_R * \tan(\delta_F)}{L_{wb}}\right) \quad (7)$$

where $\mu_1$ is the torque applied at the first port 26a and $\mu_2$ the torque applied at the second port 26b. Furthermore, $\mu_1$ ($S_1$) is a coefficient of friction of the first tire 24a as a function of a longitudinal slip ratio of the first tire 24a $S_1$ and $\mu_2$ ($S_2$) is a coefficient of friction of the second tire 24b as a function of a longitudinal slip ratio of the second tire 24b $S_2$. Furthermore, M is a first normal force on the first tire 24a, $N_2$ is a second normal force on the second tire 24b, $r_1$ is a first effective radius of the first tire 24a, and $r_2$ is a second effective radius of the second tire 24b.

Furthermore, $V'_1$ is a theoretical velocity of the first tire 24a if the torque transfer device 16 were in the unlocked state, $V'_2$ is a theoretical velocity of the second tire 24b if the torque transfer device 16 were in the unlocked state, $V_1$ is a velocity of the first tire 24a, $V_2$ is a velocity of the second tire 24b, $V_R$ is a velocity of the rear axle 36a of the vehicle 12, and V is a velocity of the vehicle 12. Furthermore, $L_c$ is a distance from a center of the rear axle 36a to an instantaneous turn center 32, $L_{tw}$ is a track width of the vehicle 12, $L_R$ is a longitudinal distance from the center of gravity 34 of the vehicle 12 to the center of the rear axle 36a, and $L_{wb}$ is a wheelbase of the vehicle 12. Furthermore, $\beta$ is a side slip angle of the vehicle 12 and $\delta_F$ is a steering angle of the third tire 24c and the fourth tire 24d.

It should be understood that the variables discussed above are either vehicle-specific constants retrieved from the media 22 (e.g., using look-up tables), measured quantities determined using vehicle sensors (e.g., wheel speed sensors), or calculated quantities determined by calculation based on vehicle-specific constants and/or measured quantities and physics and/or geometry principles. It should further be understood that the above equations are provided for an example scenario where the torque transfer device 16 is a rear locking differential and the vehicle 12 is making a turn, and that additional and/or alternative methods may be used to determine the torque applied at the first port 26a by the first tire 24a and the torque applied at the second port 26b by the second tire 24b without departing from the scope of the present disclosure. After block 106, the method 100 proceeds to block 108.

Figure 3:
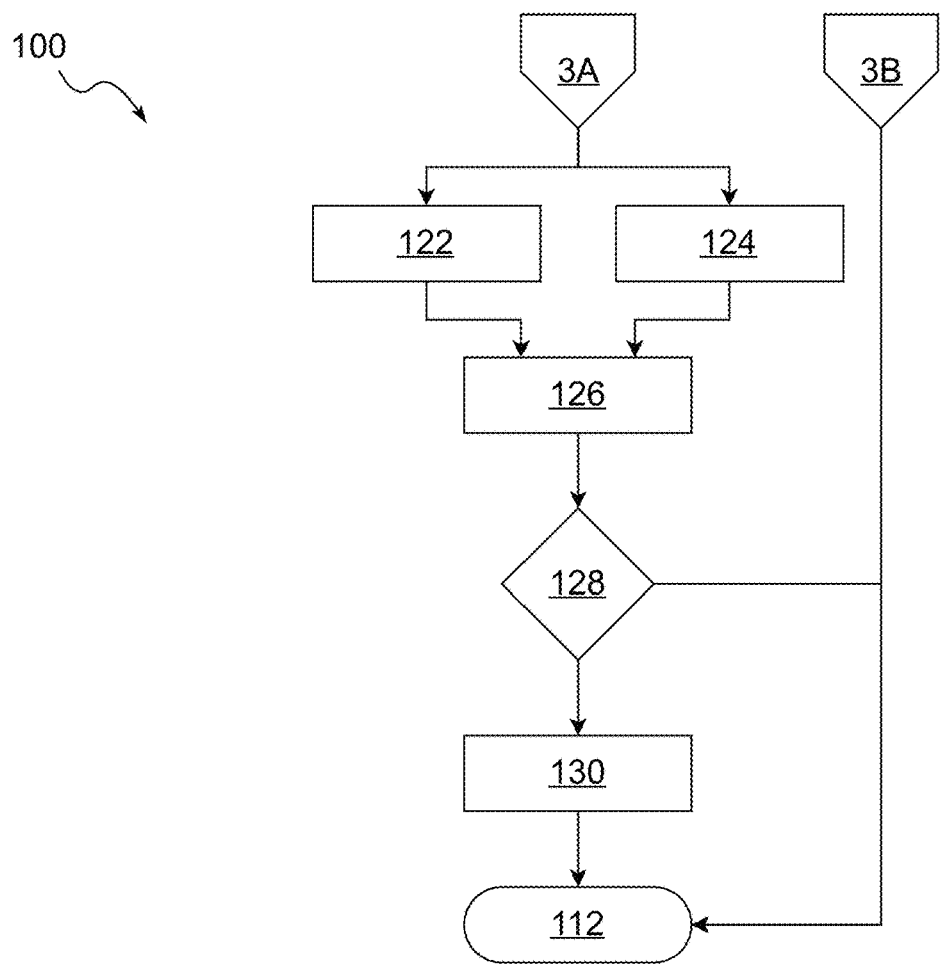
FIG. 3 is a continuation of the flowchart of FIG. 2 of the method for controlling a torque transfer device for a vehicle, according to an exemplary embodiment.

At block 108, the controller 14 identifies whether the torque transfer device 16 is in the self-locking state. In an exemplary embodiment, if the applied torque on the torque transfer device 16 determined at block 106 is greater than or equal to the self-locking torque threshold of the torque transfer device 16 determined at block 104 and the torque transfer device 16 has been commanded (e.g., by the occupant or the controller 14) to unlock (i.e., disengage a clutch to adjust operation of the torque transfer device 16), the torque transfer device 16 is determined to be in the self-locking state, and the method 100 proceeds to block 110. If the applied torque on the torque transfer device 16 determined at block 106 is less than the self-locking torque threshold of the torque transfer device 16 determined at block 104 or the torque transfer device 16 has not been commanded to unlock, the torque transfer device 16 is determined not to be in the self-locking state, and the method 100 proceeds to enter a standby state at block 112 (FIG. 3 via off-page reference 3B). After block 108, the method 100 proceeds to block 110.

At block 110, the controller 14 determines a drivetrain unlocking torque necessary to unlock the torque transfer device 16. The drivetrain unlocking torque is a torque necessary to decrease the applied torque determined at block 106 to below the self-locking torque threshold determined at block 104. In the non-limiting example where the torque transfer device 16 is a rear locking differential, a formula may be used to determine the drivetrain unlocking torque:

$$\tau_{30a} \geq |\mu_1(S_1)*N_1*r_1 + \mu_2(S_2)*N_2*r_2| - \tau_s \quad (8)$$

where $\tau_{30a}$ is the drivetrain unlocking torque provided by the first brake actuator 30a, $\mu_1$ ($S_1$) is the coefficient of friction of the first tire 24a as a function of a longitudinal slip ratio of the first tire 24a $S_1$ (see Equation 3a above), $N_1$ is the first normal force applied to the first tire 24a, $n$ is the first effective radius of the first tire 24a, $\mu_2$ ($S_2$) is a coefficient of friction of the second tire 24b as a function of a longitudinal slip ratio of the second tire 24b $S_2$ (see Equation 3b above), $N_2$ is the second normal force applied to the second tire 24b, $r_2$ is the second effective radius of the second tire 24b, and $\tau_s$ is the self-locking torque threshold determined at block 104.

It should be understood that the variables discussed above are either vehicle-specific constants retrieved from the media 22, measured quantities determined using vehicle sensors (e.g., wheel speed sensors), or calculated quantities determined by calculation based on vehicle-specific constants and/or measured quantities and physics and/or geometry principles. It should further be understood that the above equations are provided for an example scenario where the torque transfer device 16 is a rear locking differential and the vehicle 12 is making a turn, and that additional and/or alternative methods may be used to determine the drivetrain unlocking torque necessary to unlock the torque transfer device 16 without departing from the scope of the present disclosure. After block 110, the method 100 proceeds to block 114.

At block 114, the controller 14 compares the drivetrain unlocking torque determined at block 110 to a maximum drivetrain unlocking torque threshold. In the scope of the present disclosure, the maximum drivetrain unlocking torque threshold is a maximum torque which can be applied to the first port 26a and the second port 26b by the first brake actuator 30a or the second brake actuator 30b. In a non-limiting example, the maximum drivetrain unlocking torque threshold is related to a maximum clamping force of the first brake actuator 30a or the second brake actuator 30b. If the drivetrain unlocking torque determined at block 110 is greater than the maximum drivetrain unlocking torque threshold, the method 100 proceeds to enter the standby state at block 112 (FIG. 3 via off-page reference 3B). If the drivetrain unlocking torque determined at block 110 is less than or equal to the maximum drivetrain unlocking torque threshold, the method 100 proceeds to block 116.

At block 116, the controller 14 estimates a drivetrain unlocking torque dynamic effect of applying the drivetrain unlocking torque determined at block 110. In the scope of the present disclosure, the drivetrain unlocking torque dynamic effect includes an estimated longitudinal acceleration caused by applying the drivetrain unlocking torque and an estimated change in yaw caused by applying the drivetrain unlocking torque. In an exemplary embodiment, to determine the estimated longitudinal acceleration and the estimated change in yaw, the controller 14 performs vehicle dynamics calculations to determine forces and moments which would be induced by application of the drivetrain unlocking torque. In a non-limiting example, calculations are performed offline, and a look-up table of the estimated longitudinal acceleration and the estimated change in yaw corresponding to a plurality of drivetrain unlocking torque values is saved in the media 22 of the controller 14. After block 116, the method 100 proceeds to block 118.

At block 118, the controller 14 determines a drivetrain compensation torque. In the scope of the present disclosure, the drivetrain compensation torque is a torque applied by the plurality of drivetrain components 18 in order to counteract the drivetrain unlocking torque dynamic effect determined at block 116, such that the vehicle dynamics and occupant experience is minimally affected. In an exemplary embodiment, the drivetrain compensation torque is determined based at least in part on the drivetrain unlocking torque dynamic effect determined at block 116. For example, the drivetrain compensation torque is determined such as to counteract and effectively cancel the forces and moments which would be induced by application of the drivetrain unlocking torque. In the non-limiting example of the rear locking differential discussed above, a drivetrain compensation torque to counteract the estimated longitudinal acceleration may be calculated by:

$$\Delta\tau_{28b} = (\Delta\tau_{30c} + \Delta\tau_{30d}) + \frac{1}{\cos(\delta_F)} * \frac{\tau_{30a}}{(1+\tan(\delta_F)\tan(\beta))} \quad (9)$$

where $\Delta\tau_{28b}$ is a total change in torque provided to the third tire 24c and the fourth tire 24d by the front propulsion actuator 28b, $\Delta\tau_{30c}$ is a change in torque provided by the third brake actuator 30c, $\Delta\tau_{30a}$ is a change in torque provided by the fourth brake actuator 30d, $\delta_F$ is the steering angle of the third tire 24c and the fourth tire 24d, $\tau_{30a}$ is a torque provided by the first brake actuator 30a (e.g., as determined above using Equation 8), and $\beta$ is the side slip angle of the vehicle 12 (see Equation 7 above).

In the non-limiting example of the rear locking differential discussed above, a drivetrain compensation torque to counteract the estimated change in yaw may be calculated by:

$$\Delta\tau_{30d} = \frac{\frac{L_{tw}}{2}\tau_{30a} - L_f\sin(\delta_F)\Delta\tau_{28b}}{\frac{L_{tw}}{2}\cos(\delta_F) - L_f\sin(\delta_F)} \quad (10)$$

where $\Delta\tau_{30d}$ is the change in torque provided by the fourth brake actuator 30d, $L_{tw}$ is the track width of the vehicle 12, $\tau_{30a}$ is a torque provided by the first brake actuator 30a (e.g., as determined above using Equation 8), $L_f$ is a longitudinal distance from the center of gravity 34 of the vehicle 12 to a center of a front axle 36b of the vehicle 12, $\delta_F$ is the steering angle of the third tire 24c and the fourth tire 24d, and $\Delta\tau_{28b}$ is the total change in torque provided to the third tire 24c and the fourth tire 24d by the front propulsion actuator 28b.

It should be understood that the above equations are provided for the example scenario where the torque transfer device 16 is a rear locking differential and the vehicle 12 is making a turn, and that additional and/or alternative methods may be used to determine the drivetrain compensation torque without departing from the scope of the present disclosure. After block 118, the method 100 proceeds to block 120.

At block 120, the controller 14 compares the drivetrain compensation torque determined at block 118 to a maximum drivetrain compensation torque threshold. In the scope of the present disclosure, the maximum drivetrain compensation torque threshold is a maximum torque which can be applied to the third port 26c by the rear propulsion actuator 28a or the third tire 24c and the fourth tire 24d by the front propulsion actuator 28b. In a non-limiting example, the maximum drivetrain compensation torque threshold is related to a maximum torque output of the rear propulsion actuator 28a and the front propulsion actuator 28b. If the drivetrain compensation torque determined at block 118 is greater than the maximum drivetrain compensation torque threshold, the method 100 proceeds to enter the standby state at block 112 (FIG. 3 via off-page reference 3B). If the drivetrain compensation torque determined at block 118 is less than or equal to the maximum drivetrain compensation torque threshold, the method 100 proceeds to blocks 122 and 124 (FIG. 3 via off-page reference 3A).

Referring to FIG. 3, a continuation of the flowchart of FIG. 2 of the method 100 for controlling a torque transfer device for a vehicle is shown. At block 122, the controller 14 determines a drivetrain unlocking torque application profile. In the scope of the present disclosure, the drivetrain unlocking torque application profile describes a "shape" of an application of the drivetrain unlocking torque over time.

Figure 4:
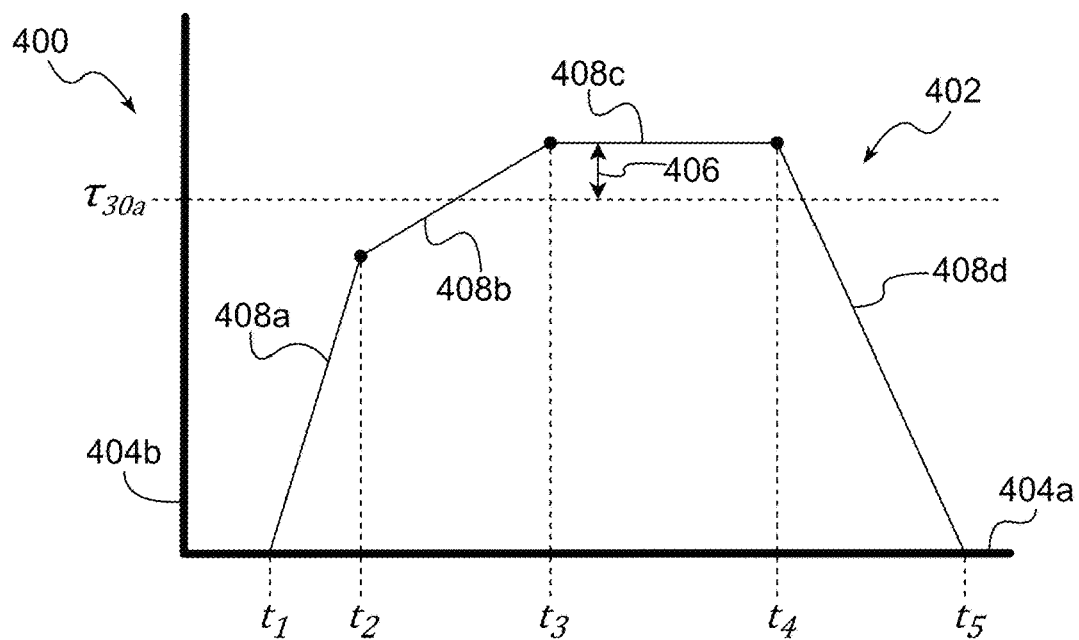
FIG. 4 is an exemplary graph of an exemplary drivetrain unlocking torque application profile, according to an exemplary embodiment.

Referring to FIG. 4, an exemplary graph 400 of an exemplary drivetrain unlocking torque application profile 402 is shown. The exemplary graph 400 includes an x-axis 404a representing time and a y-axis 404b representing applied torque magnitude. The drivetrain unlocking torque determined at block 110 (i.e., the drivetrain unlocking torque provided by the first brake actuator 30a $\tau_{30a}$) is indicated by a dashed line. A maximum excess torque 406 is defined as a difference between a maximum value of the exemplary drivetrain unlocking torque application profile 402 and the drivetrain unlocking torque determined at block 110. The exemplary drivetrain unlocking torque application profile 402 includes a first segment 408a from time $t_1$ to time $t_2$, a second segment 408b from time $t_2$ to time $t_3$, a third segment 408c from time $t_3$ to time $t_4$, and a fourth segment 408d from time $t_4$ to time $t_5$.

Referring again to FIG. 3 and with continued reference to FIG. 4, the drivetrain unlocking torque application profile is chosen such as to minimize vehicle dynamic effects while maximizing a chance of resolving the self-locking state of the torque transfer device 16. The times $t_1$, $t_2$, $t_3$, $t_4$, $t_5$ are adjusted relative to each other and the maximum excess torque 406 is adjusted to vary the drivetrain unlocking torque application profile. In an exemplary embodiment, a constant torque profile is provided when a difference between time $t_4$ and time $t_3$ is long enough such that the torque value of the drivetrain unlocking torque application profile remains greater than or equal to the drivetrain unlocking torque and that the torque value of the drivetrain unlocking torque application profile remains constant (i.e., having a first derivative approximately equal to zero) during a majority (i.e., greater than or equal to fifty percent) of a drivetrain unlocking torque application process (i.e., the time between time $t_1$ and time $t_5$).

In another exemplary embodiment, the time $t_4$ may be delayed until confirmation of resolution of the self-locking state is received, for example, by detection of clutch position using a sensor of the torque transfer device 16, by measurement of back EMF (electromagnetic field) produced by a solenoid of the torque transfer device 16 in response to clutch movement, by detection of changes in wheel speed due to resolution of the self-locking state, and/or the like.

In another exemplary embodiment, a variable torque profile is provided when the difference between time $t_4$ and time $t_3$ is short enough (e.g., when time $t_4$ is equal to time $t_3$) such that the torque value of the drivetrain unlocking torque application profile peaks at a value greater than or equal to the drivetrain unlocking torque and that the torque value of the drivetrain unlocking torque application profile varies (i.e., has a magnitude of the first derivative greater than zero) during a majority (i.e., greater than or equal to fifty percent) of the drivetrain unlocking torque application process (i.e., the time between time $t_1$ and time $t_5$).

In another exemplary embodiment, the drivetrain unlocking torque may be periodic, quasi-periodic, or otherwise fluctuating in time due to mechanical oscillations. Therefore, the variable torque profile may be adjusted such that the torque value of the drivetrain unlocking torque application profile peaks when the drivetrain unlocking torque reaches a minimum value, increasing a chance of successfully resolving the self-locking state.

It should be understood that the above discussion of the drivetrain unlocking torque application profile is merely exemplary in nature, and that alternative and/or additional methods for determining the drivetrain unlocking torque application profile, including, for example, methods accounting for vehicle dynamics (e.g., current acceleration of the vehicle 12, current yaw rate of the vehicle 12, etc.), current status of the plurality of drivetrain components 18, quantity and success of previous unlocking attempts, and/or the like are within the scope of the present disclosure. Referring again to FIG. 3, after block 122, the method 100 proceeds to block 126 as will be discussed in greater detail below.

At block 124, the controller 14 determines a drivetrain compensation torque application profile. In the scope of the present disclosure, the drivetrain compensation torque application profile describes a "shape" of an application of the drivetrain compensation torque over time. In an exemplary embodiment, the drivetrain compensation torque application profile has a same or similar shape to the drivetrain unlocking torque application profile determined at block 122, such that the drivetrain compensation torque application profile effectively compensates the dynamic effects of the application of the drivetrain unlocking torque. In another exemplary embodiment, the drivetrain compensation torque application profile is determined in a similar method to the drivetrain unlocking torque application profile, as discussed above in reference to block 122. Therefore, the disclosure above in reference to block 122 is also applicable for the determination of the drivetrain compensation torque application profile. After block 124, the method 100 proceeds to block 126.

At block 126, the controller 14 estimates a total dynamic effect of applying the drivetrain unlocking torque determined at block 110 according to the drivetrain unlocking torque application profile determined at block 122 and applying the drivetrain compensation torque determined at block 118 according to the drivetrain compensation torque application profile determined at block 124. In the scope of the present disclosure, the total dynamic effect includes an estimated total longitudinal acceleration and an estimated total change in yaw of the vehicle 12 when both the drivetrain unlocking torque and the drivetrain compensation torque are applied. Ideally, the total dynamic effect would be zero. However, in some situations, the total dynamic effect is non-zero.

In an exemplary embodiment, to determine the estimated total longitudinal acceleration and the estimated total change in yaw, the controller 14 performs vehicle dynamics calculations to determine forces and moments which would be induced by application of the drivetrain unlocking torque determined at block 110 according to the drivetrain unlocking torque application profile determined at block 122 and application of the drivetrain compensation torque determined at block 118 according to the drivetrain compensation torque application profile determined at block 124. In a non-limiting example, calculations are performed offline, and a look-up table of the estimated longitudinal total acceleration and the estimated total change in yaw corresponding to a plurality of combinations of drivetrain unlocking torque application profiles and drivetrain compensation torque application profiles is saved in the media 22 of the controller 14. After block 126, the method 100 proceeds to block 128.

At block 128, the controller 14 compares the total dynamic effect determined at block 126 to a predetermined total dynamic effect threshold. In an exemplary embodiment, the predetermined total dynamic effect threshold includes a total longitudinal acceleration threshold and a total change in yaw threshold. In a non-limiting example, the total longitudinal acceleration threshold and the total change in yaw threshold are chosen such as to ensure stability of the vehicle 12 (e.g., to prevent loss of control of the vehicle 12). In an exemplary embodiment, the total longitudinal acceleration threshold and the total change in yaw threshold are predetermined and are stored in the media 22 of the controller 14. If the total dynamic effect is greater than the predetermined total dynamic effect threshold, the method 100 proceeds to enter the standby state at block 112. If the total dynamic effect is less than or equal to the predetermined total dynamic effect threshold, the method 100 proceeds to block 130.

At block 130, the controller 14 applies the drivetrain unlocking torque determined at block 110 according to the drivetrain unlocking torque application profile determined at block 122 and the drivetrain compensation torque determined at block 118 according to the drivetrain compensation torque application profile determined at block 124. The drivetrain unlocking torque and the drivetrain compensation torque are applied using the plurality of drivetrain components 18. In the non-limiting example of the rear locking differential discussed above, the drivetrain unlocking torque is applied using the first brake actuator 30a and the drivetrain compensation torque is applied using the third brake actuator 30c, the fourth brake actuator 30d, the rear propulsion actuator 28a, and/or the front propulsion actuator 28b.

In an exemplary embodiment, the controller 14 also detects confirmation of resolution of the self-locking state, for example, by detection of clutch position using a sensor of the torque transfer device 16, by measurement of back EMF (electromagnetic field) produced by a solenoid of the torque transfer device 16 in response to clutch movement, by detection of changes in wheel speed due to resolution of the self-locking state, and/or the like. In a non-limiting example, block 130 is repeatedly executed until resolution of the self-locking state is confirmed or until a predetermined unlocking attempt threshold is surpassed. After block 130, the method 100 proceeds to enter the standby state at block 112.

In an exemplary embodiment, the controller 14 repeatedly exits the standby state 112 and restarts the method 100 at block 102. In a non-limiting example, the controller 14 exits the standby state 112 and restarts the method 100 on a timer, for example, every three hundred milliseconds.

The system 10 and method 100 of the present disclosure offer several advantages. Using the system 10 and method 100, torque transfer devices may be successfully disengaged under a wider range of conditions without the need for active disengagement hardware, thus increasing efficiency and decreasing resource use. Furthermore, by estimating and compensating for vehicle dynamic effects, disruption to the occupant experience is minimized and vehicle stability is maintained. Additionally, the system 10 and method 100 are applicable to various types of torque transfer devices, such as, for example, locking differentials, limited slip locking differentials, automatic locking differentials, transfer cases, front/rear axle disconnect systems, wheel end disconnect systems, transfer case or power transfer unit disconnect systems, and/or the like.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for controlling a torque transfer device for a vehicle, the method comprising:
   determining a self-locking torque threshold of the torque transfer device based at least in part on a mechanical design of the torque transfer device;
   determining an applied torque on the torque transfer device; and
   identifying a self-locking state of the torque transfer device in response to determining that the applied torque is greater than or equal to the self-locking torque threshold;
   determining a drivetrain unlocking torque necessary to unlock the torque transfer device in response to identifying the self-locking state;
   determining a drivetrain compensation torque necessary to counteract a drivetrain unlocking torque dynamic effect of the drivetrain unlocking torque in response to identifying the self-locking state; and
   applying the drivetrain unlocking torque and the drivetrain compensation torque using one or more drivetrain components of the vehicle in response to identifying the self-locking state.

2. The method of claim 1, wherein determining the applied torque further comprises:
   determining the applied torque on the torque transfer device using a formula:

$$\tau_A = |\tau_1 - \tau_2|$$

wherein $\tau_A$ is the applied torque on the torque transfer device, $\tau_1$ is a torque on a first port of the torque transfer device, and $\tau_2$ is a torque on a second port of the torque transfer device.

3. The method of claim 1, wherein determining the drivetrain unlocking torque further comprises:
   determining the drivetrain unlocking torque necessary to unlock the torque transfer device using a formula:

$$\tau_u \geq |\mu_1(S_1)*N_1*r_1 + \mu_2(S_2)*N_2*r_2| - \tau_s$$

wherein $\tau_u$ is the drivetrain unlocking torque, $\mu_1$ is a first coefficient of friction as a function of a first longitudinal slip ratio $S_1$ of a first tire connected to a first port of the torque transfer device, $N_1$ is a first normal force applied to the first tire, r is a first effective radius of the first tire, $\mu_2$ is a second coefficient of friction as a function of a second longitudinal slip ratio $S_2$ of a second tire connected to a second port of the torque transfer device, $N_2$ is a second normal force applied to the second tire, $r_2$ is a second effective radius of the second tire, and $\tau_s$ is the self-locking torque threshold.

4. The method of claim 1, wherein determining the drivetrain compensation torque further comprises:
   estimating the drivetrain unlocking torque dynamic effect of applying the drivetrain unlocking torque using the one or more drivetrain components of the vehicle; and
   determining the drivetrain compensation torque based at least in part on the drivetrain unlocking torque dynamic effect.

5. The method of claim 4, wherein estimating the drivetrain unlocking torque dynamic effect further comprises:
   determining an estimated longitudinal acceleration caused by applying the drivetrain unlocking torque using the one or more drivetrain components of the vehicle;
   determining an estimated change in yaw caused by applying the drivetrain unlocking torque using the one or more drivetrain components of the vehicle; and
   estimating the drivetrain unlocking torque dynamic effect, wherein the drivetrain unlocking torque dynamic effect includes the estimated longitudinal acceleration and the estimated change in yaw.

6. The method of claim 1, wherein applying the drivetrain unlocking torque and the drivetrain compensation torque further comprises:
   comparing the drivetrain unlocking torque to a maximum drivetrain unlocking torque threshold;
   comparing the drivetrain compensation torque to a maximum drivetrain compensation torque threshold; and
   applying the drivetrain unlocking torque and the drivetrain compensation torque in response to determining that the drivetrain unlocking torque is less than or equal to the maximum drivetrain unlocking torque threshold and that the drivetrain compensation torque is less than or equal to the maximum drivetrain compensation torque threshold.

7. The method of claim 1, wherein applying the drivetrain unlocking torque and the drivetrain compensation torque further comprises:
   estimating a total dynamic effect of applying the drivetrain unlocking torque and the drivetrain compensation torque;
   comparing the total dynamic effect to a predetermined total dynamic effect threshold; and
   applying the drivetrain unlocking torque and the drivetrain compensation torque in response to determining that the total dynamic effect is less than or equal to the predetermined total dynamic effect threshold.

8. The method of claim 1, wherein applying the drivetrain unlocking torque and the drivetrain compensation torque further comprises:

determining a drivetrain unlocking torque application profile, wherein the drivetrain unlocking torque application profile includes one of: a constant torque profile and a variable torque profile, wherein the constant torque profile includes application of a constant torque greater than or equal to the drivetrain unlocking torque during a majority of a duration of a drivetrain unlocking torque application process, and wherein the variable torque profile includes application of a variable torque having a peak value greater than or equal to the drivetrain unlocking torque and a varying torque value during the majority of the duration of the drivetrain unlocking torque application process; and applying the drivetrain unlocking torque and the drivetrain compensation torque based at least in part on the drivetrain unlocking torque application profile.

9. The method of claim 1, wherein applying the drivetrain unlocking torque and the drivetrain compensation torque further comprises:

applying the drivetrain unlocking torque using one or more brake actuators of the vehicle; and applying the drivetrain compensation torque using at least one of: the one or more brake actuators of the vehicle and one or more propulsion actuators of the vehicle.

10. A system for controlling a torque transfer device for a vehicle, the system comprising:

the torque transfer device having a first port and a second port, wherein the torque transfer device is an electronically controllable locking differential;

a first brake actuator mechanically connected with the first port of the torque transfer device;

a second brake actuator mechanically connected with the second port of the torque transfer device; and a controller in electrical communication with the first brake actuator and the second brake actuator, wherein the controller is programmed to:

determine a self-locking torque threshold of the torque transfer device based at least in part on a mechanical design of the torque transfer device;

determine an applied torque on the torque transfer device using a formula:

$\tau_\Delta = |\tau_1 - \tau_2|$ wherein $\tau_\Delta$ is the applied torque on the torque transfer device, Ti is a torque on a first port of the torque transfer device, and $t_2$ is a torque on a second port of the torque transfer device;

identify a self-locking state of the torque transfer device in response to determining that the applied torque is greater than or equal to the self-locking torque threshold;

determine a drivetrain unlocking torque necessary to unlock the torque transfer device in response to identifying the self-locking state; and apply the drivetrain unlocking torque using at least one of the first brake actuator and the second brake actuator.

11. The system of claim 10, wherein to determine the drivetrain unlocking torque, the controller is further programmed to:

determine the drivetrain unlocking torque necessary to unlock the torque transfer device using a formula:

$\tau_u \geq |\mu_1(S_1) * N_1 * r_1 + \mu_2(S_2) * N_2 * r_2| - \tau_s$ wherein $\tau_u$ is the drivetrain unlocking torque, $\mu_1$ is a first coefficient of friction as a function of a first longitudinal slip ratio $S_1$ of a first tire connected to the first port of the torque transfer device, $N_1$ is a first normal force applied to the first tire, $r_1$ is a first effective radius of the first tire, $\mu_2$ is a second coefficient of friction as a function of a second longitudinal slip ratio $S_2$ of a second tire connected to the second port of the torque transfer device, $N_2$ is a second normal force applied to the second tire, $r_2$ is a second effective radius of the second tire, and $\tau_s$ is the self-locking torque threshold.

12. The system of claim 11, wherein to apply the drivetrain unlocking torque, the controller is further programmed to:

determine a drivetrain unlocking torque application profile, wherein the drivetrain unlocking torque application profile includes one of: a constant torque profile and a variable torque profile, wherein the constant torque profile includes application of a constant torque greater than or equal to the drivetrain unlocking torque during a majority of a duration of a drivetrain unlocking torque application process, and wherein the variable torque profile includes application of a variable torque having a peak value greater than or equal to the drivetrain unlocking torque and a varying torque value during the majority of the duration of the drivetrain unlocking torque application process; and apply the drivetrain unlocking torque based at least in part on the drivetrain unlocking torque application profile.

13. The system of claim 11, further comprising a propulsion actuator in electrical communication with the controller, wherein the controller is further programmed to:

determine a drivetrain compensation torque necessary to counteract a drivetrain unlocking torque dynamic effect of the drivetrain unlocking torque in response to identifying the self-locking state; and apply the drivetrain compensation torque using the propulsion actuator.

14. The system of claim 13, wherein to determine the drivetrain compensation torque, the controller is further programmed to:

determine an estimated longitudinal acceleration caused by applying the drivetrain unlocking torque using at least one of the first brake actuator and the second brake actuator;

determine an estimated change in yaw caused by applying the drivetrain unlocking torque using at least one of the first brake actuator and the second brake actuator;

estimate a drivetrain unlocking torque dynamic effect, wherein the drivetrain unlocking torque dynamic effect includes the estimated longitudinal acceleration and the estimated change in yaw; and determine the drivetrain compensation torque based at least in part on the drivetrain unlocking torque dynamic effect.

15. The system of claim 14, wherein to apply the drivetrain unlocking torque and the drivetrain compensation torque, the controller is further programmed to:

compare the drivetrain unlocking torque to a maximum drivetrain unlocking torque threshold;

compare the drivetrain compensation torque to a maximum drivetrain compensation torque threshold;

estimate a total dynamic effect of applying the drivetrain unlocking torque and the drivetrain compensation torque;

compare the total dynamic effect to a predetermined total dynamic effect threshold; and apply the drivetrain unlocking torque and the drivetrain compensation torque in response to determining that the drivetrain unlocking torque is less than or equal to the maximum drivetrain unlocking torque threshold, that the drivetrain compensation torque is less than or equal to the maximum drivetrain compensation torque threshold, and that the total dynamic effect is less than or equal to the predetermined total dynamic effect threshold.

16. A method for controlling a torque transfer device for a vehicle, the method comprising:
    identifying a self-locking state of a rear locking differential of the vehicle;
    determining a drivetrain unlocking torque necessary to unlock the torque transfer device in response to identifying the self-locking state, wherein the drivetrain unlocking torque is determined using a formula:
    $$\tau_u \geq |\mu_1(S_1)*N_1*r_1 + \mu_2(S_2)*N_2*r_2| - \tau_s$$
    wherein $\tau_u$ is the drivetrain unlocking torque provided by a rear brake actuator, $\mu_1$ is a first coefficient of friction as a function of a first longitudinal slip ratio $S_1$ of a first tire connected to a first port of the rear locking differential, $N_1$ is a first normal force applied to the first tire, $r_1$ is a first effective radius of the first tire, $\mu_2$ is a second coefficient of friction as a function of a second longitudinal slip ratio $S_2$ of a second tire connected to a second port of the rear locking differential, $N_2$ is a second normal force applied to the second tire, $r_2$ is a second effective radius of the second tire, and $\tau_s$ is a self-locking torque threshold;
    determining a drivetrain compensation torque necessary to counteract a drivetrain unlocking torque dynamic effect of the drivetrain unlocking torque in response to identifying the self-locking state; and
    applying the drivetrain unlocking torque and the drivetrain compensation torque using at least one of: the rear brake actuator, a front propulsion actuator, and a rear propulsion actuator of the vehicle in response to identifying the self-locking state.

17. The method of claim 16, wherein applying the drivetrain unlocking torque and the drivetrain compensation torque further comprises:
    estimating a total dynamic effect of applying the drivetrain unlocking torque and the drivetrain compensation torque;
    comparing the total dynamic effect to a predetermined total dynamic effect threshold;
    comparing the drivetrain unlocking torque to a maximum drivetrain unlocking torque threshold;
    comparing the drivetrain compensation torque to a maximum drivetrain compensation torque threshold;
    determining a drivetrain unlocking torque application profile, wherein the drivetrain unlocking torque application profile includes one of: a constant torque profile and a variable torque profile, wherein the constant torque profile includes application of a constant torque greater than or equal to the drivetrain unlocking torque during a majority of a duration of a drivetrain unlocking torque application process, and wherein the variable torque profile includes application of a variable torque having a peak value greater than or equal to the drivetrain unlocking torque and a varying torque value during the majority of the duration of the drivetrain unlocking torque application process; and
    applying the drivetrain unlocking torque and the drivetrain compensation torque based at least in part on the drivetrain unlocking torque application profile in response to determining that the drivetrain unlocking torque is less than or equal to the maximum drivetrain unlocking torque threshold, that the drivetrain compensation torque is less than or equal to the maximum drivetrain compensation torque threshold, and that the total dynamic effect is less than or equal to the predetermined total dynamic effect threshold.

* * * * *